Oct. 27, 1959

E. D. SCHLAPHOFF 2,910,130

FOLDABLE MOTOR SCOOTER

Filed April 22, 1957

INVENTOR
Erwin D. Schlaphoff

BY *Dodge and Son*

ATTORNEYS

Oct. 27, 1959 — E. D. SCHLAPHOFF — 2,910,130
FOLDABLE MOTOR SCOOTER
Filed April 22, 1957 — 2 Sheets-Sheet 2

INVENTOR
Erwin D. Schlaphoff
BY *Dodge and Son*
ATTORNEYS

United States Patent Office 2,910,130
Patented Oct. 27, 1959

2,910,130

FOLDABLE MOTOR SCOOTER

Erwin D. Schlaphoff, Waverly, Nebr.

Application April 22, 1957, Serial No. 654,370

3 Claims. (Cl. 180—33)

This invention relates to motor vehicles. Particularly, it relates to motor scooters of the two-wheel or three-wheel type which are so constructed that they may be folded for purposes of storage. Such vehicles are not broadly new.

The important feature of the present invention is the fact that when the vehicle is folded, all of its parts are completely within the margins of the box-like rear frame portion characteristic of vehicles of this type. This arrangement of parts in the folded position of the vehicle is important because storage is facilitated since all of the exposed surfaces of the folded vehicle are flat, which means that other boxes may be stored on top of or adjacent to the vehicle without there being any waste space. Similarly, if more than one vehicle is to be stored in one storage compartment, there is a minimum amount of wasted space. The saving in storage space is important because vehicles are commonly used to afford a secondary means of transportation to people who are travelling by small boat or airplane and need some means of over-land transportation at their destination.

Another important feature is that the motor and rear wheel are mounted on a frame which is pivoted at its forward end to the main frame of the vehicle and at its rear end is connected with the main frame by a spring. The spring may be disconnected from the pivoted frame so that the frame may be swung upward into the box-like rear frame portion for storage.

The invention will be described having reference to the accompanying drawings, in which.

Figure 1:
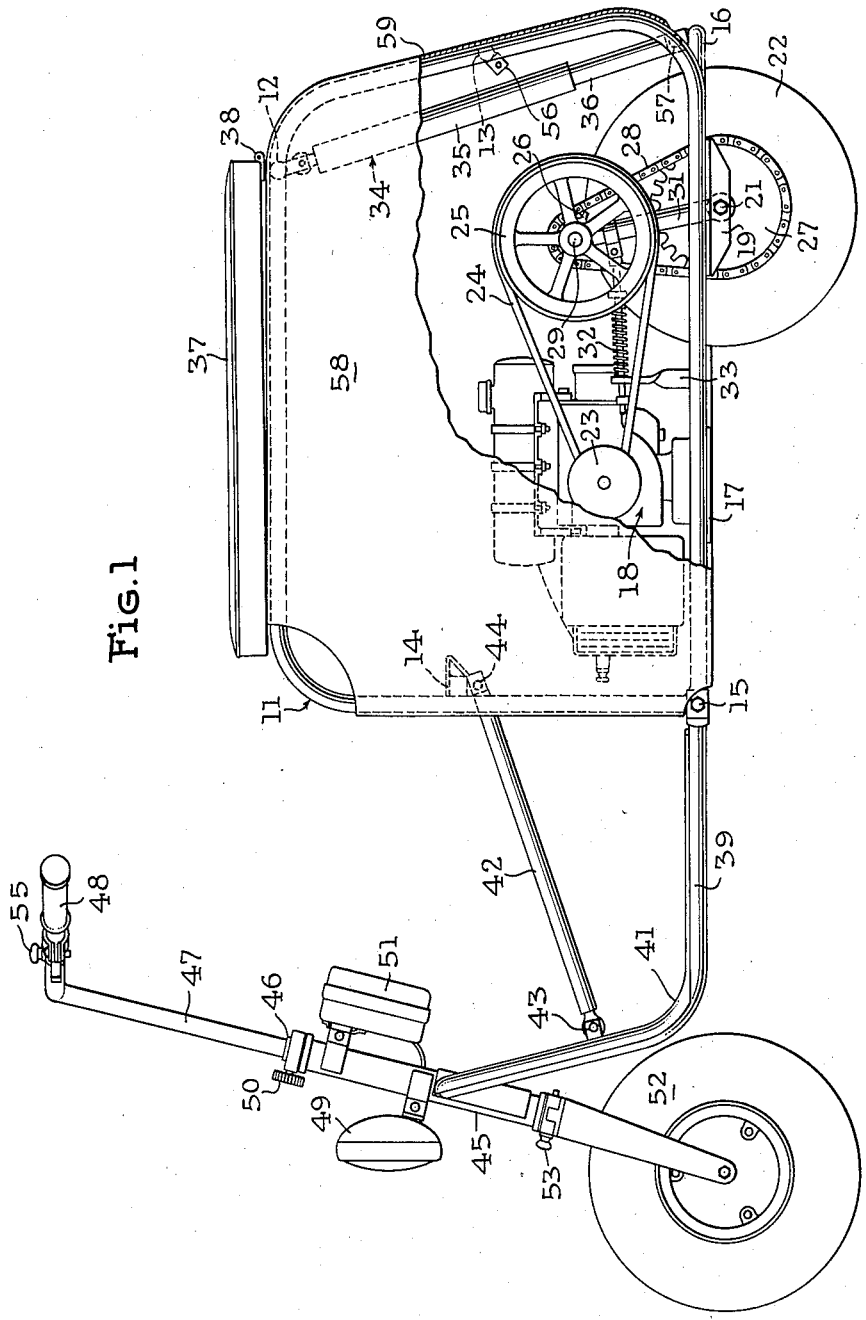
Fig. 1 is a side elevation of a two-wheeled motor scooter embodying the present invention.

Refer first to Fig. 1. The rear portion comprises an open-faced box-like frame, the margins of the opposite sides of which comprise laterally spaced tubular members bent into a generally trapezoidal form. One of these members is indicated at 11. Members 11, on opposite sides of the vehicle, are connected by two transverse members 12 and 13 and by a third transverse member 14 having an offset central portion which is spaced back from the front face of the box-like frame.

At the lower forward margin of the rear frame portion there is a hinge axis 15. Pivoted to swing about this axis 15 are the legs of a yoke 16 which is generally U-shaped in top elevation. Connected to the yoke 16 is a bed plate, one edge of which appears at 17, and which sustains a conventional internal combustion engine 18. Near the rear of the yoke 16 and on each of its legs are brackets, one of which is indicated at 19 in Fig. 1. Brackets 19 sustain the opposite ends of an axle 21 which carries the rear road wheel 22.

A conventional driving connection between the motor and the wheel is provided and includes a drive pulley 23 and belt 24, a pulley 25, sprockets 26 and 27 and chain 28. The sprocket 26 and the pulley 25 are keyed to a shaft 29 journalled in the upper end of a swinging arm 31 pivoted about the axle 21. A spring 32 reacts between the bracket 33 attached to the yoke 16 and the swinging arm 31 and normally maintains the belt tight.

A spring assembly 34 reacts between the transverse member 12 and the closed end of the yoke 16. This assembly comprises telescopic cylindrical members 35 and 36 and a spring (not shown) which reacts between them. Conveniently, a cushion 37 is provided on the top face of the rear frame portions and is hinged at its rear edge as indicated at 38.

The front frame portion comprises a marginal tubular frame member 39 of the form shown. It is provided with a covering 41 of sheet material which affords a horizontal platform.

A strut 42 is arranged to react between the front and rear frame portions to maintain the vehicle in its normal position. This strut 42 is pivoted to the front frame as indicated at 43 and is releasably pinned to the transverse member 14 on the rear frame, as indicated at 44.

Carried at the forward end of the member 39 is a steering head 45 in which the steering column 46 is journalled. A rod 47 is telescopically received in the steering column 46 and may be adjusted vertically to vary the height of the handle bars 48. Set screw 50 secures it in its adjusted position. A head light 49 and its battery 51 are also carried by the steering head 45. A front wheel and fork assembly 52 is releasably secured to the lower end of the steering column 46 by means of pin 53. The outer end portions of the handle bars 48 are hinged about pivot pins 54 (see Fig. 2) and may be latched in their operative position by means of the removable pins 55.

Figure 2:
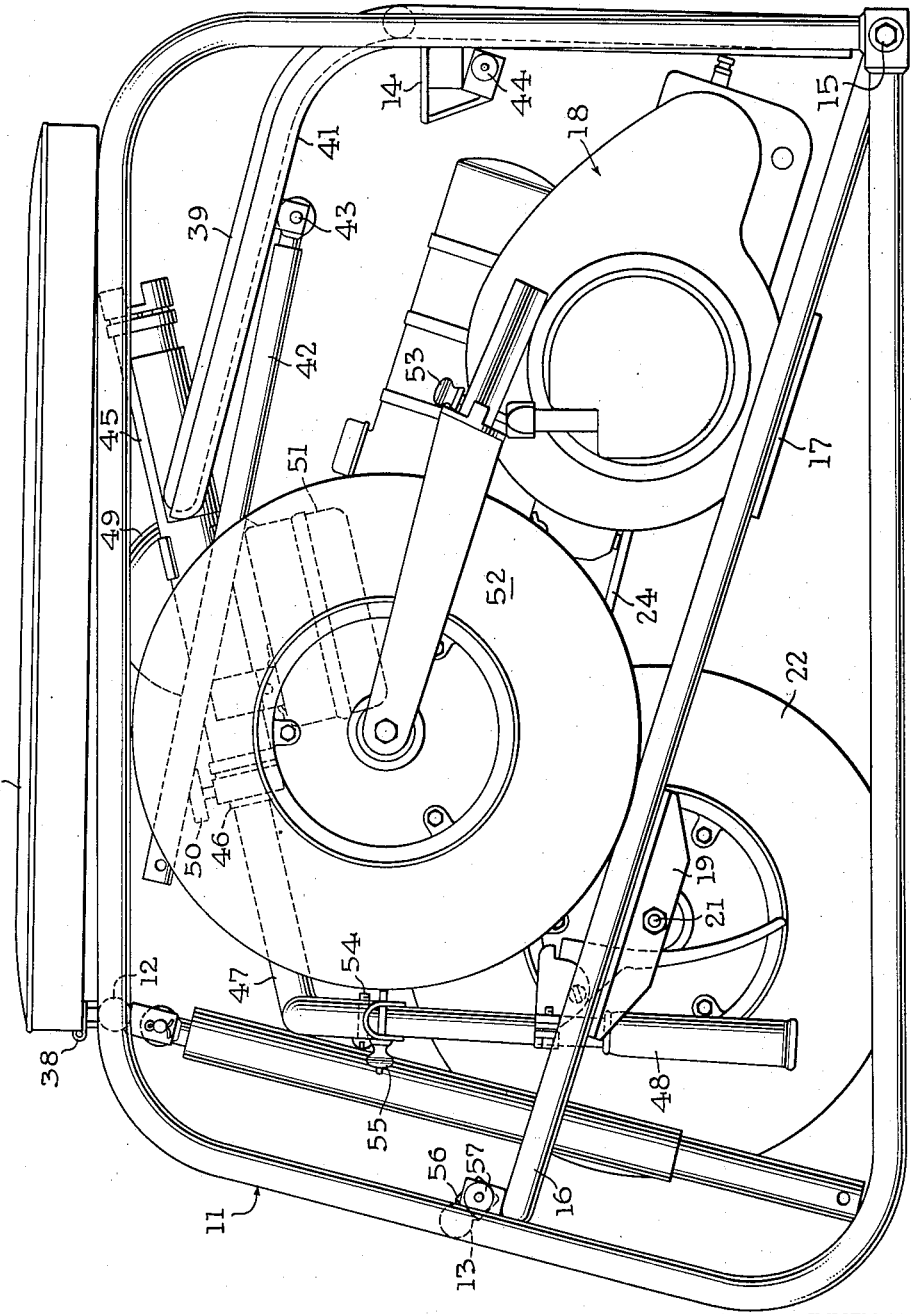
Fig. 2 is a view from the other side of the vehicle shown in Fig. 1 and showing the vehicle in its folded position.

Referring now to Fig. 2, it will be seen that in the folded position of the vehicle, the yoke 16 is swung upward and latched to a boss 56 by means of the removable pin 57 which was formerly used to connect the lower end of the spring 34 to the yoke 16. After the yoke 16 has been pinned in this position, the front wheel and fork assembly 52 is removed and the rear end of the strut 42 is unlatched from the transverse member 14 so that the front frame portion may be swung upward into the position shown in Fig. 2. Then, the front wheel and fork assembly 52 is inserted through the top of the rear frame portion into the position illustrated in Fig. 2. Cushion 37 is then returned to its normal position.

In Fig. 1, the rear frame portion is shown provided with a facing on the opposite lateral faces. This facing is indicated by the reference numeral 58. It will be apparent that the presence of this facing 58 is not essential. The rear face is similarly encased; the edge of this casing appearing at 59 in Fig. 1.

It will be noted when the vehicle is folded, (as shown in Fig. 2) that all of the components of the vehicle are received entirely within the rear frame portion. This rear frame portion has flat faces and is generally in the form of a right rectangular prism. This shape lends itself to easy storage with a minimum amount of waste space. The complete enclosure of the component parts in the folded position of the vehicle, protects these parts against damage which might result from careless handling of the vehicle during storage.

What is claimed is:

1. A power driven vehicle having a normal operating position and a folded position comprising in combination a front frame portion and a box-like open-faced rear frame portion; a steering head carried by said front frame portion; a dirigible steering column journalled in said head; a front wheel and fork assembly releasably secured to said column; a hinge interconnecting said portions, said hinge having a horizontal axis normal to the longitudinal centerline of the vehicle and located between the rear of the front frame portion and the lower front margin of the rear frame portion; releasable means reacting between said portions to secure them in said operating position; a rearward extending yoke pivotally connected with said rear frame portion to swing about a horizontal transverse axis; a motor; at least one road wheel driven thereby, said motor and road wheel being carried by said yoke; releasable means reacting between said yoke and said rear frame portion and projecting said wheel outward beneath the lower face of said rear frame portion, the recited components being so dimensioned relatively to each other that the road wheel, the motor, the yoke, the front wheel and fork assembly, the front portion, the steering head, steering column and both releasable means are all received entirely within the rear frame portion in the folded position of said vehicle.

2. The combination defined in claim 1 in which said yoke is pivotally connected to said rear portion to swing about said hinge axis.

3. The combination defined in claim 1 in which the second of said releasable means comprises a spring.

References Cited in the file of this patent

UNITED STATES PATENTS

| | | |
|---|---|---|
| 1,506,270 | Pullin | Aug. 26, 1924 |
| 2,209,632 | Martin | July 30, 1940 |
| 2,589,793 | Franks | Mar. 18, 1952 |
| 2,696,272 | Schlaphoff | Dec. 7, 1954 |

FOREIGN PATENTS

| | | |
|---|---|---|
| 706,835 | Great Britain | Apr. 7, 1954 |
| 465,545 | Italy | Sept. 7, 1954 |